(12) United States Patent
Wolfe et al.

(10) Patent No.: US 9,821,965 B2
(45) Date of Patent: *Nov. 21, 2017

(54) SYSTEM AND METHOD FOR LOCKING A CARRIER/CONTAINER FOR TRACKING, CONTROLLING ACCESS, AND PROVIDING DELIVERY CONFIRMATION

(71) Applicant: CAROLINA LOGISTICS SERVICES, LLC, Winston-Salem, NC (US)

(72) Inventors: David G. Wolfe, Wexford, PA (US); Spencer W. Allen, Wexford, PA (US)

(73) Assignee: CAROLINA LOGISTICS SERVICES, LLC, Winston-Salem, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/457,345

(22) Filed: Mar. 13, 2017

(65) Prior Publication Data
US 2017/0183169 A1 Jun. 29, 2017

Related U.S. Application Data

(63) Continuation of application No. 14/268,417, filed on May 2, 2014, now Pat. No. 9,592,969.
(Continued)

(51) Int. Cl.
*B65G 51/44* (2006.01)

(52) U.S. Cl.
CPC .................. *B65G 51/44* (2013.01)

(58) Field of Classification Search
USPC .................... 235/376; 705/58; 700/237, 226
See application file for complete search history.

(56) References Cited

U.S. PATENT DOCUMENTS

| 5,636,947 A | 6/1997 | Valerino, Sr. et al. |
| 5,655,677 A | 8/1997 | Fratello et al. |

(Continued)

OTHER PUBLICATIONS

"Swisslog Announces New NexSeal™ Pneumatic Tube System Carrier", dated Nov. 28, 2012, printed from http://www.prweb.com/printer/10155841.htm, Internet site, accessed Aug. 25, 2014, 2 pages.

(Continued)

*Primary Examiner* — Allyson Trail
(74) *Attorney, Agent, or Firm* — Allen, Dyer, Doppelt + Gilchrist, P.A.

(57) ABSTRACT

A system and method for tracking/controlling access to transported articles, includes a computing module in signal communication with sending and receiving stations. A first input device at the sending station receives identifying information identifying a carrier ("carrier ID") and an item ("item ID") placed within the locked carrier. The carrier ID and the item ID are transmitted to the computing module. A second input device at the receiving station receives the carrier ID for a carrier received at the receiving station and identifying information for an individual ("user ID") at the receiving station provided access to the locked carrier. The carrier ID and the user ID are transmitted to the computing module, which unlocks the carrier and allows access to the item inside, and records the user ID of the individual provided access and the associated carrier ID and/or item ID to provide chain of custody information for the item.

22 Claims, 9 Drawing Sheets

Related U.S. Application Data (60) Provisional application No. 61/819,110, filed on May 3, 2013.

(56) References Cited

U.S. PATENT DOCUMENTS

| | | | |
|---|---|---|---|
| 5,805,454 | A | 9/1998 | Valerino, Sr. et al. |
| 5,871,308 | A | 2/1999 | Valerino, Sr. et al. |
| 5,896,297 | A | 4/1999 | Valerino, Sr. |
| 5,901,966 | A | 5/1999 | Valerino, Sr. et al. |
| 5,980,164 | A | 11/1999 | Fratello |
| 6,048,086 | A | 4/2000 | Valerino, Sr. |
| 6,173,212 | B1 | 1/2001 | Valerino, Sr. |
| 6,202,004 | B1 | 3/2001 | Valerino, Sr. |
| 6,477,442 | B1 | 11/2002 | Valerino, Sr. |
| 6,672,807 | B1 | 1/2004 | McIntyre et al. |
| 6,672,808 | B1 | 1/2004 | McIntyre et al. |
| 6,712,561 | B1 | 3/2004 | Valerino, Sr. et al. |
| 7,097,391 | B1 | 8/2006 | Keller et al. |
| 7,241,081 | B1 | 7/2007 | Keller et al. |
| 7,363,106 | B1 | 4/2008 | Hoganson et al. |
| 7,424,340 | B2 | 9/2008 | Owens |
| 7,455,481 | B1 | 11/2008 | Keller et al. |
| 7,751,930 | B2 | 7/2010 | Valerino, Sr. |
| 7,874,768 | B1 | 1/2011 | Keller et al. |
| 7,953,515 | B2 | 5/2011 | Hoganson et al. |
| 8,029,212 | B2 | 10/2011 | Valerino, Sr. |
| 8,116,906 | B2 | 2/2012 | Valerino, Sr. |
| 8,267,622 | B1 | 9/2012 | MacLean-Blevins et al. |
| 8,447,427 | B2 | 5/2013 | Hoganson et al. |
| 8,491,225 | B2 | 7/2013 | Valerino, Sr. |
| 8,948,914 | B2 | 2/2015 | Zini et al. |
| 2005/0104716 | A1 | 5/2005 | Simms et al. |
| 2007/0219916 | A1 | 9/2007 | Lucas |
| 2008/0143476 | A1 | 6/2008 | Kwok et al. |
| 2008/0252414 | A1 | 10/2008 | Crigger et al. |
| 2010/0039682 | A1 | 2/2010 | Peot et al. |
| 2010/0094451 | A1 | 4/2010 | Hoganson et al. |
| 2010/0234995 | A1 | 9/2010 | Zini et al. |
| 2010/0253519 | A1 | 10/2010 | Brackmann et al. |
| 2011/0068041 | A1 | 3/2011 | Naik et al. |
| 2011/0133948 | A1 | 6/2011 | Ervin |
| 2014/0081448 | A1 | 3/2014 | Hoganson |

OTHER PUBLICATIONS

Notification of Transmittal of the International Search Report and the Written Opinion of the International Searching Authority, International Search Report and Written Opinion of the International Searching Authority for PCT/US2014/036596, dated Sep. 25, 2014 (8 pages).

SYSTEM AND METHOD FOR LOCKING A CARRIER/CONTAINER FOR TRACKING, CONTROLLING ACCESS, AND PROVIDING DELIVERY CONFIRMATION

CROSS-REFERENCE TO RELATED APPLICATIONS

This patent application is a continuation application claiming priority to co-pending U.S. patent application Ser. No. 14/268,417, filed on May 2, 2014, which claims the benefit of U.S. Provisional Patent Application No. 61/819,110, filed on May 3, 2013, the disclosures of which are hereby incorporated by reference in their entireties.

FIELD OF THE INVENTION

The present disclosure is directed toward systems and methods for locking and tracking containers/carriers and their associated content, and controlling access to the contents within the containers/carriers, as well as providing delivery confirmation to authorized users, in order to provide, for example, a chain of custody trail for the containers/carriers and their associated content, as well as to ensure that the containers/carriers are opened by only authorized individuals.

BACKGROUND OF THE INVENTION

When delivering an item or items of importance, it is generally desirable to know where the item is, control who has access to the item, and know when the item has been accessed and by whom. Such tracking of the handling of an item is often generically called "chain of custody". Establishing the chain of custody of an item can be of importance in a variety of industries and applications.

When the method of delivery is controlled, e.g., by using a trusted, responsible, and reliable person or delivery service or method, the chain of custody information can be collected (e.g., by manual or electronic record keeping) and controlled (e.g., by allowing only authorized persons access to the items). In certain instances, it may be desirable or necessary to deliver important items using a method of delivery that is not sufficiently trusted and/or responsible and/or reliable for purposes of maintaining a chain of custody (e.g., various mechanical transport systems, unreliable delivery persons, delivery services without confirmation, etc.). In these cases, another system and method must be implemented to provide a sufficient chain of custody for the item of importance.

As an example, the delivery of items to various locations via a pneumatic tube delivery system is widely known and utilized. Pneumatic tube systems can be implemented in a variety of industries, settings and environments where it is desirable to transport items between locations quickly and efficiently. For example, such systems can be implemented in financial institutions, healthcare institutions, manufacturing environments, transportation terminals, retail settings, etc. Virtually any setting where items need to be moved from one place to another can implement a pneumatic tube system.

One application where a pneumatic tube system has particular utility is in a healthcare or hospital setting where items of importance need to be transported between remote locations quickly and efficiently. Pneumatic tube systems replaced manual delivery, which was not only time consuming, but often unsecure and unreliable. In such a healthcare or hospital setting, items of importance, such as, for example, medications (both prescription and non-prescription), laboratory specimens, blood products, IV bags, equipment, etc., need to be transported quickly and reliably between locations. While such a system has its advantages for quick and reliable delivery, it also has its shortcomings when delivering items requiring restricted access to the delivered items in order to establish a sufficient chain of custody.

Typically, in such pneumatic tube delivery systems, once a container reaches its destined receiving station, it can be readily opened by whatever person happens to be at the station. Access to the tubes is not restricted. Such ease of accessibility is a particular concern in a healthcare or hospital setting when transporting prescription medications, such as, for example, narcotics. To control unrestricted access to items, systems have been developed where the container is not delivered to the receiving station until an authorized person releases it for delivery. In this manner, the system knows the authorized person is there at the receiving station to receive the container and its restricted contents. However, in these types of systems, the container remains in the pneumatic tube system at a position near the receiving station until it is released by an authorized person for delivery. The container thus blocks the tube system for further deliveries until the authorized person releases the tube for delivery to the receiving station.

The systems and methods described herein are directed toward overcoming one or more of the above-mentioned problems. Although aspects of the inventive system and method will be described herein with reference to a preferred embodiment of a hospital setting with a pneumatic tube delivery system, one skilled in the art will appreciate that the inventive system and method may be applied in an endless variety of delivery-related applications in many environments (both indoor and outdoor) without departing from the spirit and scope of the present invention.

SUMMARY OF THE INVENTION

In a general form, the present disclosure provides a means to lock a container intended for transport to another location and, at that location, provide a code or the ability necessary to open the locked container by an authorized person. In a preferred form, the container is a container designed for delivery via a pneumatic tube delivery system, of course, other delivery mechanisms are contemplated herein.

In accordance with the present disclosure, a lock is provided on the container, which lock can be mechanical or electronic in operation. A mechanical lock can be user activated, e.g., by a dial or tumblers, or otherwise mechanically actuated, e.g., by a physical release actuated mechanically. An electrical or electronic lock can be powered either internally by, for example, a battery, or powered externally through physical or non-physical coupling, for example, by an electrical connector or magnetic or radio frequency fields. An electrical or electronic lock can also be user activated by typing or inputting, for example, a code on a keypad or touch device, or actuated electrically by a signal applied either directly or indirectly, for example, by an electrical connector or magnetic or radio frequency fields. The container can be a container designed to go inside a carrier utilized in a transport system (e.g., a pneumatic tube delivery system), or the container can be the carrier itself. For example, the container can be a briefcase or a suitcase, a carrier for a pneumatic tube delivery system, or another type of carrier intended for manual, robotic, or other automatic transport. The container may also be configured to fit inside these types of carriers. As used herein, the terms "container" and "carrier" shall be given their broadest reasonable interpretation and shall be used interchangeably to mean either the actual transport device (e.g., the carrier apparatus of a pneumatic tube delivery system) or a separate device placed within the actual transport device.

The present disclosure also includes a means to associate a container's identity with an item placed within it. For example, a user (typically at the sending station) can manually record, enter or key-in an identifying code of the container in use (e.g., container ID), along with an identifying code of the item or items placed within the container (e.g., item ID). This association can also be done more automatically using, for example, barcodes, RFID tags/readers, near field communication ("NFC") tags/readers, and/or other identifying means for either or both the container and item(s). This association can be used to provide access control at the receiving location by allowing only an authorized person or persons access to the carrier contents.

The present disclosure additionally includes a means at a receiving location to identify the carrier and/or its contents, and allow only authorized persons access to the contents. The carrier ID and/or the item(s) ID can be determined at the receiving location by many techniques, such as, for example, by barcodes and barcode readers, RFID tags/readers, NFC tags/readers, other wireless technologies, physical labels, mechanical or electrical connections, and/or any other suitable means. An authorized person (e.g., user ID) can also be identified by many techniques, such as, for example, by barcodes and barcode readers, magnetic card/stripe readers, RFID tags/readers, NFC tags/readers, other wireless technologies, PIN codes, biometric identification, and/or any other suitable means.

If access control of the contents is not required, then no authentication step is performed. However, even if authentication is not required, the user ID can still be used to track the individual(s) who accessed the container and the content within. If access control is required, then the carrier ID and/or item(s) ID and the user ID are used to determine if the identified user is authorized to gain access to the container.

In furtherance of the present disclosure, the receiving location also includes a means to provide an authorized person the ability to open the locked container. This ability can take a number of forms. For example, a code may be displayed to the authorized user on a display or other device, which code is to be entered on a mechanical or electronic entry device (i.e., the lock) on the container in order to unlock and open the container. Alternately, a docking station may be provided which functions to manually or automatically open the container using various means after authenticating an authorized user, such as, for example, a mechanical connection to the carrier, such connection being either automatically or manually powered, or an electrical connection to the container, either through physical or non-physical coupling, for example, by an electrical connector or magnetic field or radio frequency field. One skilled in the art will appreciate that virtually any means of opening the locked container after authenticating an authorized user may be implemented without departing from the spirit and scope of the present invention The receiving location can also include a means to communicate with a computing module to facilitate providing the container code or other signal to initiate the ability of a person to open the container upon authenticating an authorized user. This communication means can be accomplished with any networking technique, including wired or wireless connections, etc. The computing module also facilitates the collection, storage, and reporting of chain of custody information by tracking the carrier IDs, item IDs and user IDs, using, for example, various standard computing techniques. The history log (e.g., chain of custody) of the carrier and/or the item(s) can also be displayed on the display at the receiving location.

In one version or form of the present disclosure, a mechanical lock is provided on one or more carriers intended for use in a pneumatic tube delivery system. The carriers each having a barcode label attached thereto. One or more receiving locations are each provided with a barcode reader and associated display. The barcode reader is used to read the carrier ID on the container, which may have an associated item ID identifying the contents of the container. If authorization is required, the barcode reader can read the user ID, and if the user is authorized to access the contents within the container, the mechanical lock code (e.g., combination) is provided to the user on the associated display. Upon entry of the combination, the container is opened and the contents are accessed by the authorized user. Information regarding the user ID, the container ID, item(s) ID, time of access, etc. are all recorded at the computing module to establish a chain of custody. More complicated systems can contain, for example, hundreds or thousands of carriers, and tens or hundreds of receiving and/or sending locations.

In accordance with the present disclosure, a system for tracking and controlling access to transported articles is provided which includes a computing module having a database and a processor connected to the database, the computing module being in signal communication with a sending station and a receiving station; a first input device provided at the sending station and configured for receiving identifying information identifying a carrier ("carrier ID") and an item ("item ID") placed within the carrier for delivery, wherein the carrier ID and the item ID are transmitted to the computing module and the carrier is locked prior to delivery; and a second input device provided at the receiving station and configured for receiving the carrier ID for a carrier received at the receiving station and identifying information for an individual ("user ID") at the receiving station provided access to the carrier, wherein the carrier ID and the user ID are transmitted to the computing module. The computing module is configured to unlock the carrier and allow access to the item inside, and record the user ID of the individual that is provided access to the item within the carrier, and the associated carrier ID and/or item ID to provide chain of custody information for tracking the item.

In one form, the first input device comprises a barcode reader for scanning an identifying tag on the container to obtain the carrier ID and an identifying tag on the item to obtain the item ID, and wherein the second input device comprises a second barcode reader for scanning the identifying tag on the received container to obtain the carrier ID and an identifying tag of the individual at the receiving station to obtain the user ID.

In another form, the carrier includes a combination lock for locking the carrier and securing the item within, and wherein the computing module unlocks the carrier by providing the individual with a combination to the combination lock via the second input device.

In yet another form, the computing module automatically unlocks the received carrier upon receiving the user ID from the second input device. Additionally, the computing module is configured to provide chain of custody information for the carrier and/or its contents.

In a further form, the first input device is further configured for receiving identifying information identifying an individual authorized to open the carrier and access the item placed within ("authorized user ID"), wherein the authorized user ID is transmitted to the computing module. The computing module is configured to unlock the carrier and allow access to the item inside if the user ID matches the authorized user ID for the carrier ID received at the receiving station, and to record the user ID of the individual that is provided access to the item within the carrier, and the associated carrier ID and/or item ID to provide chain of custody information for tracking the item.

In yet a further form, the first input device is further configured for receiving identifying information identifying an intended destination of the carrier, and the computing module is configured to unlock the carrier and allow access to the item inside if it is determined, by the computing module, that the carrier is at its intended destination, and to record the user ID of the individual that is provided access to the item within the carrier, and the associated carrier ID and/or item ID to provide chain of custody information for tracking the item.

The first input device at the sending station can receive the carrier ID and the item ID via at least one of RFID tags/readers and NFC tags/readers. The second input device at the receiving station can receive the user ID via at least one of RFID tags/readers, NFC tags/readers and magnetic card/stripe readers. The computing module is configured to display a history log of the carrier and/or the item on a display located at the receiving station.

In still a further form, the carrier is transported from the sending station to the receiving station though tubes of a pneumatic tube delivery system.

In accordance with the present disclosure, a method for tracking and controlling access to transported articles is provided which includes the steps of receiving, by a computing module including a processor and a data storage medium, identification information for a carrier ("carrier ID") and an item ("item ID") placed within the carrier, the identification information sent from a first input device at a sending station; locking the carrier with the item inside; transporting the locked carrier from a sending station to a receiving station; receiving, by the computing system, the carrier ID for the carrier received at the receiving station and an individual ("user ID") located at the receiving station, the identification information sent from a second input device at the receiving station; unlocking the carrier; and recording the user ID of the individual that is provided access to the item within the carrier, and the associated carrier ID and/or item ID to provide chain of custody information for tracking the item.

In one form, the sending station includes a barcode reader for scanning an identifying tag on the container to obtain the carrier ID and an identifying tag on the item to obtain the item ID, and sending the scanned identification information to the computing module, and wherein the receiving station includes a second barcode reader for scanning the identifying tag on the received container to obtain the carrier ID and an identifying tag of the individual to obtain the user ID at the receiving station, and sending the scanned identifying information to the computing module.

In another form, the carrier includes a combination lock for locking the carrier and securing the item within, and wherein the computing module provides the individual with a combination to the combination lock via the second input device.

In yet another form, the computing module automatically unlocks the received carrier upon receiving the user ID from the second input device. Additionally, the computing module is configured to provide chain of custody information for the carrier and/or its contents based on the identification information from the sending and receiving stations.

In a further form, the method further includes the step of receiving, by the computing module, identification information for an authorized recipient ("authorized user ID") of the item within the carrier. The computing module is configured to unlock the carrier and allow access to the item inside if the user ID matches the authorized user ID for the carrier ID received at the receiving station, and to record the user ID of the individual that is provided access to the item within the carrier, and the associated carrier ID and/or item ID to provide chain of custody information for tracking the item.

In yet a further form, the method further includes the step of receiving, by the computing module, identifying information identifying an intended destination of the carrier. The computing module is configured to unlock the carrier and allow access to the item inside if it is determined, by the computing module, that the carrier is at its intended destination, and to record the user ID of the individual that is provided access to the item within the carrier, and the associated carrier ID and/or item ID to provide chain of custody information for tracking the item.

The first input device at the sending station can receive the carrier ID and the item ID via at least one of RFID tags/readers and NFC tags/readers. The second input device at the receiving station can receive the user ID via at least one of RFID tags/readers, NFC tags/readers and magnetic card/stripe readers. The computing module is configured to display a history log of the carrier and/or the item on a display located at the receiving station.

In still a further form, the carrier is transported from the sending station to the receiving station though tubes of a pneumatic tube delivery system.

It is a purpose of the present disclosure to capture the person who receives and opens a carrier.

It is a further purpose of the present disclosure to capture the time a carrier was opened.

It is a yet a further purpose of the present disclosure to notify the sender and receiver when the carrier is delivered to the wrong location. Additionally, it is contemplated that the person receiving it at the wrong location won't be able to open it.

It is still a further purpose of the present disclosure to allow the carrier to be opened by only specific person(s), i.e., authorized individuals.

It is an object of the present disclosure to provide a system and method of providing chain of custody for items when the method of delivery is not sufficiently trusted and/or responsible and/or reliable.

It is a further object of the present disclosure to provide a system and method of providing chain of custody for items delivered in a pneumatic tube delivery system.

Other objects, aspects, purposes and advantages of the presently described system and method can be obtained from a study of the specification, the drawings, and the appended claims.

BRIEF DESCRIPTION OF THE DRAWINGS

The inventive system and method is explained hereinafter in more detail by way of example and by means of exemplary embodiments illustrated in the various figures included herewith. In the Figures.

DETAILED DESCRIPTION OF THE INVENTION

While the present disclosure includes exemplary embodiments illustrating the inventive principles, the present disclosure is not limited thereto. Various other techniques, systems, modules, modes of operation, operating systems, etc. may be implemented in accordance with the teachings of the present disclosure. Some elements of the present disclosure may be described as modules or stations performing certain functions. While these elements may be described in terms of software for performing certain functions, one skilled in the art will appreciate that such elements may also incorporate hardware or combinations of software and hardware to perform the described functions without departing from the spirit and scope of the present invention disclosure. Additionally, any well-known elements, systems or methods for carrying out the principles of the present disclosure are not described in detail herein, as they are understood by one of ordinary skill in the art.

Figure 1:
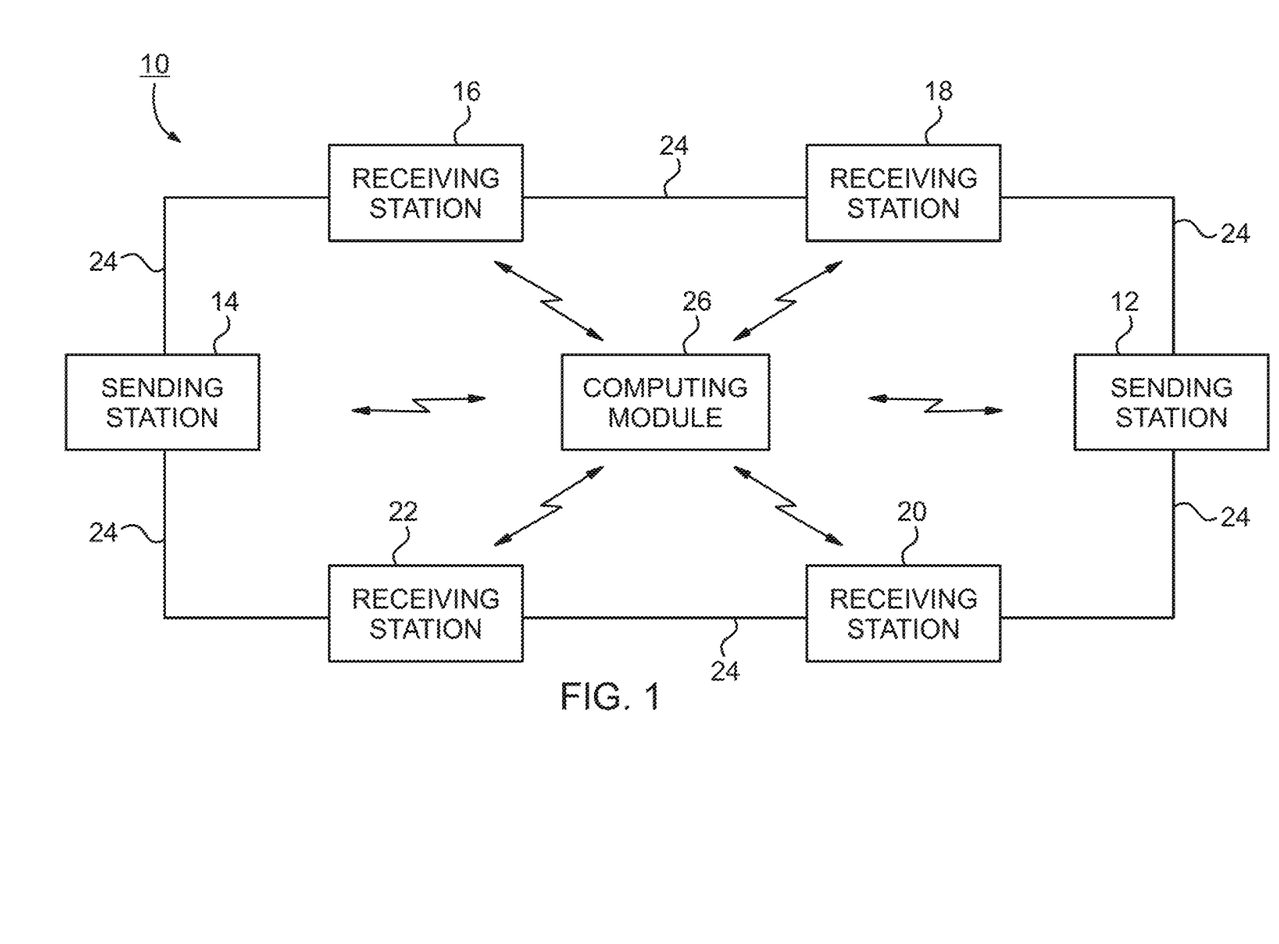
FIG. 1 is schematic diagram illustrating an exemplary system for tracking, controlling access to, and providing delivery confirmation for carriers according to an embodiment of the present disclosure.

Referring to FIG. 1, a system 10 is shown for tracking, controlling access to, and providing delivery confirmation for carriers/containers according to an embodiment of the present disclosure. While the system 10 will be described herein as a pneumatic tube delivery system, the present disclosure is not limited to such a system, and other delivery mechanisms are contemplated herein.

As shown in FIG. 1, the system 10 includes a plurality of sending stations 12, 14 and receiving stations 16, 18, 20, 22 operably connected to one another by a plurality of tube conduits 24. The tube conduits 24 permit carriers (shown and described hereafter) to be sent between the various sending 12, 14 and receiving 16, 18, 20, 22 stations in conventional pneumatic tube delivery manners. It will be appreciated that the tube conduits 24 are not limited to the particular connection configuration shown in FIG. 1, but may connected to the various sending 12, 14 and receiving 16, 18, 20, 22 stations in various connection configurations. As also shown in FIG. 1, the sending 12, 14 and receiving 16, 18, 20, 22 stations are in communication with a computing module 26. Communication between the sending 12, 14 and receiving 16, 18, 20, 22 stations and the computing module 26 may be via any conventional or suitable wired or wireless connection.

Figure 2:
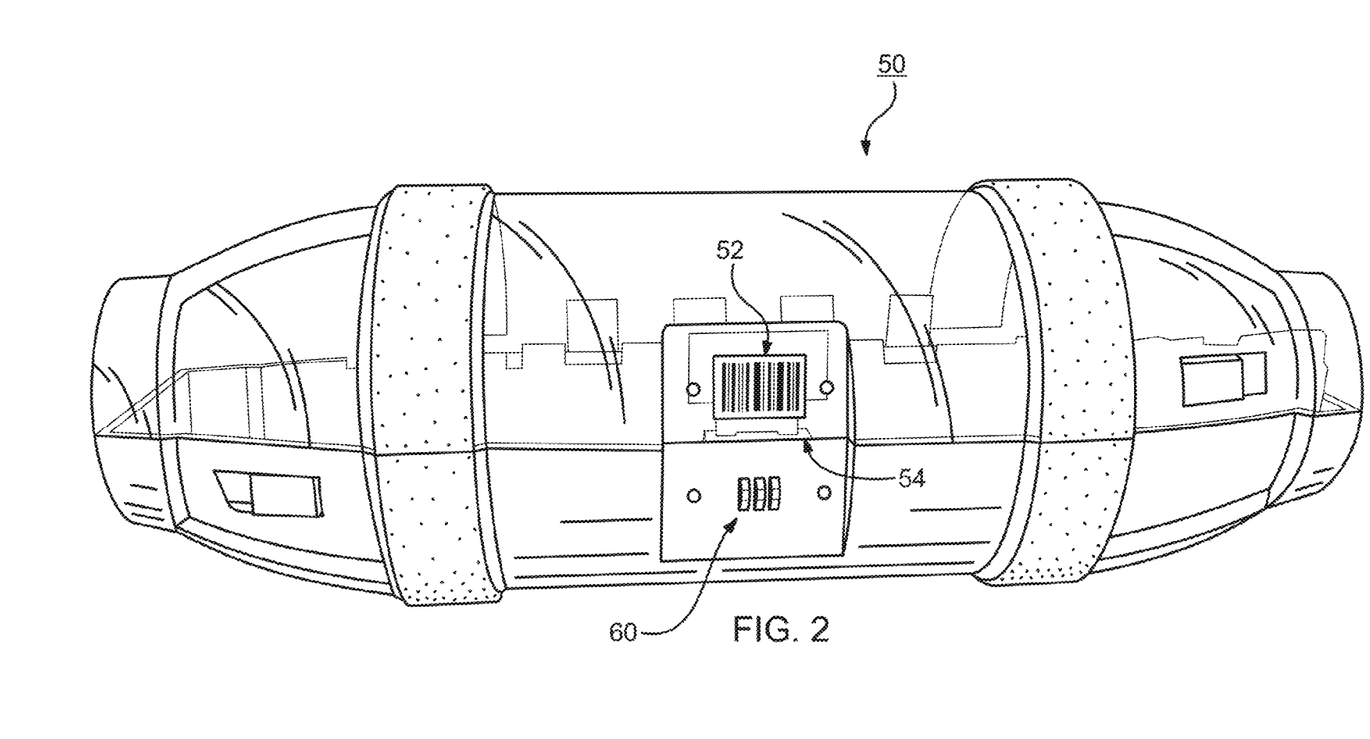
FIGS. 2-4 illustrate a carrier designed for the transport of items to/from various stations within the exemplary system.
Figure 3:
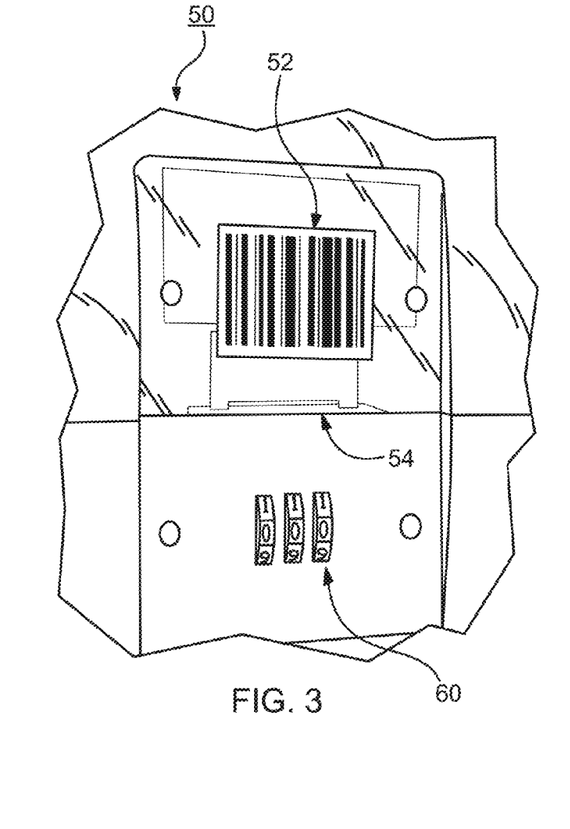
Figure 4:
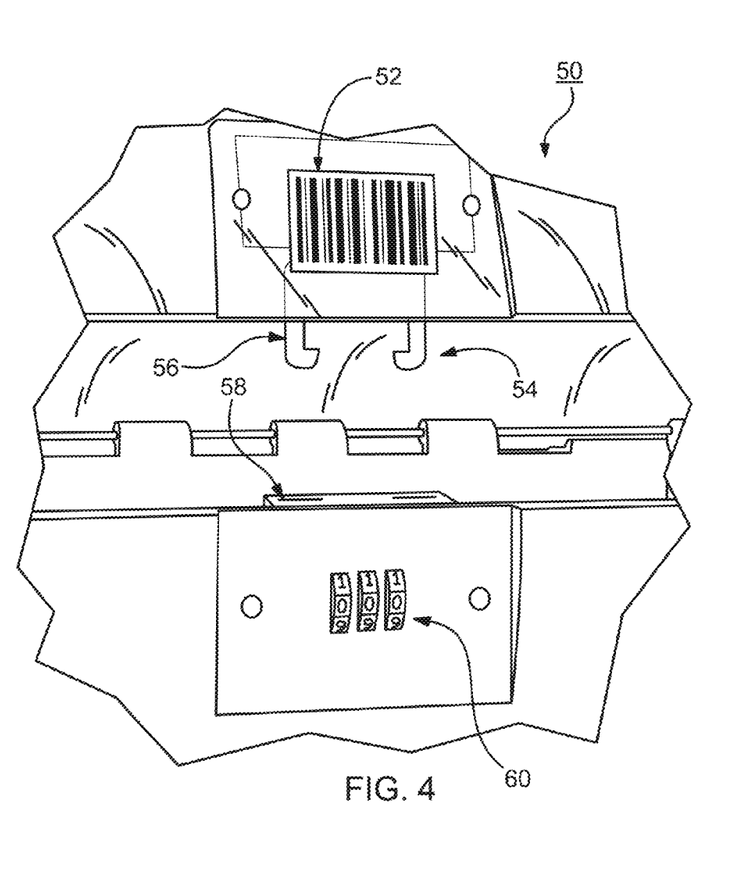

FIGS. 2-4 show an exemplary carrier 50 designed for operation within the system 10 to carry items for delivery between the various sending 12, 14 and receiving 16, 18, 20, 22 stations. The carrier 50 includes a generally cylindrical shape so that it may travel through the tube conduits 24 in a conventional manner. The carrier 50 may be a two-part carrier, hinged on one side so that it may be opened and closed to insert and remove items to be delivered. Such carriers are generally known in the art and further description is not necessitated.

The carrier 50 includes an identifying element in the form of, for example, a barcode 52 (i.e., carrier ID), which identifies the particular carrier 50. The carrier 50 also includes a locking mechanism in the form of a mechanical lock 54. The lock 54 includes a male latching mechanism 56 attached to one half of the carrier 50, which is received in a female element 58 attached to the other half of the carrier 50. When the carrier 50 is closed and the latching mechanism 56 engages the female element 58, the carrier 50 is locked. To unlock the carrier 50, a user must input the appropriate 3-digit code, at input 60, to disengage the latching mechanism 56 from the female element 58 and open the carrier 50. In this manner, items within the carrier 50 may be securely transported to a desired location with restricted access. It will be understood by one skilled in the art that other identifying elements may be applied to the carrier 50 and other types of locks may be implemented in accordance with the present disclosure. For example, while the input 60 of the lock 54 is shown as utilizing rotating dials or tumblers, the input 60 may be a keypad or other means for a user to input appropriate information. Further, the system 10 (e.g., via the computing module 26) may automatically unlock the lock 54 upon receiving a valid ID (e.g., either a valid hospital ID when access is not restricted or an authorized user ID when access is restricted).

Figure 5:
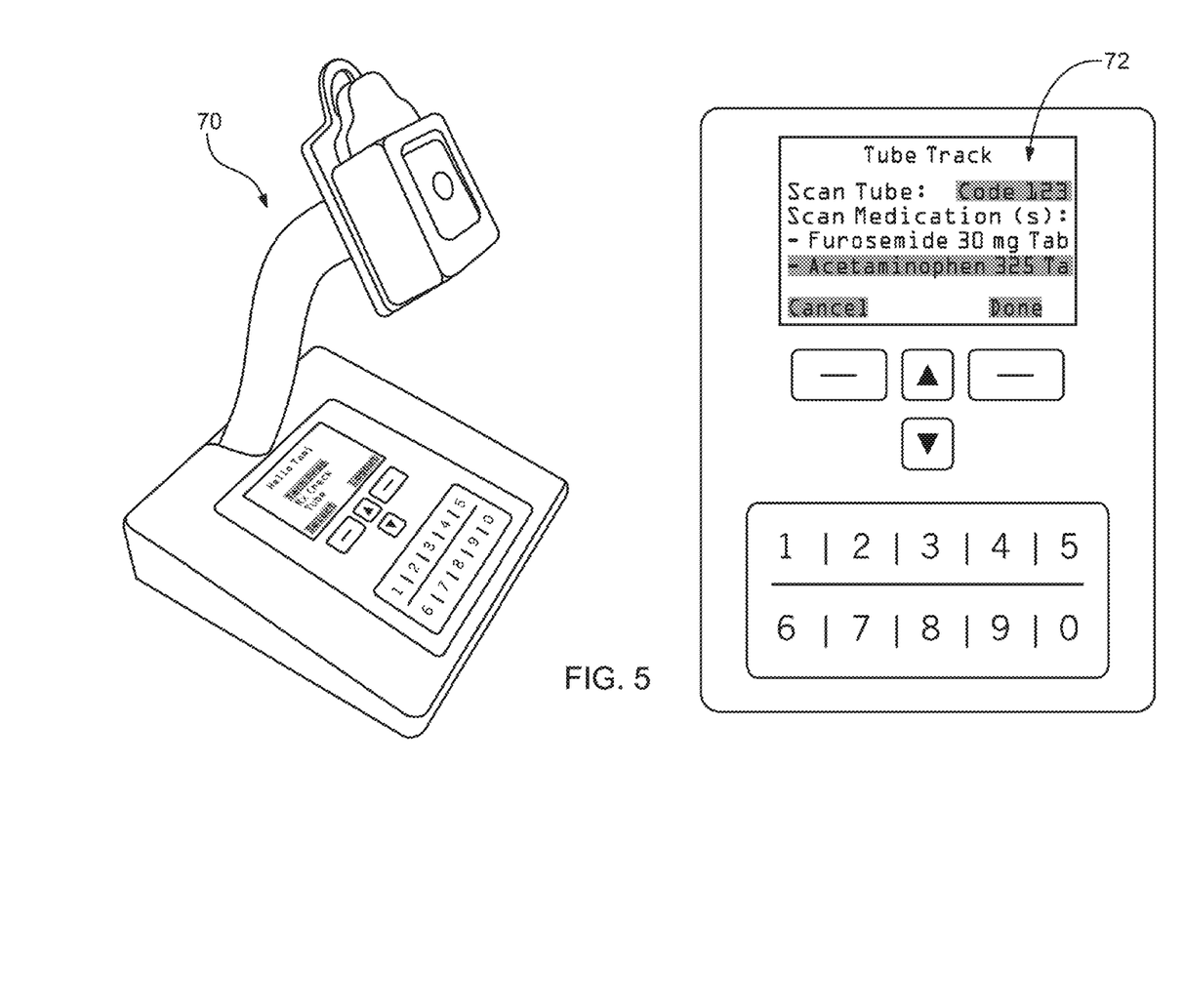
FIG. 5 illustrates an input device having a barcode scanner/reader provided at the sending stations included within the exemplary system.

To prepare a container 50 for delivery, FIG. 5 illustrates an input device 70 having a barcode scanner/reader provided at the sending stations 12 and 14 (shown in FIG. 1). To begin the process, a user will typically scan the barcode on their employee identification badge or otherwise input an identification number to log in. The barcode (container ID) 52 on the carrier 50 is then scanned in via the barcode reader/scanner, or may be otherwise input. Any items that will be placed in the carrier 50 will also have appropriate barcodes (item ID) in order to identify the items. The barcodes for the items are also scanned in via the barcode reader/scanner, or are otherwise input. If the items placed in the carrier 50 require restricted access, the user ID of the person or person(s) who may access the carrier 50, and hence the items within, are also input via the input device 70. Tube track information is provided at 72 to a user so they can see the information entered into the system regarding the carrier 50 and items within the carrier 50. If access is restricted to the carrier 50, information regarding the individual(s) authorized to open the carrier (e.g., user ID, name, etc.) may also be provided within the tube track in formation 72.

The input information regarding, for example, the employee ID, the container ID, the item(s) ID and user ID are communicated by the sending stations 12 and 14 to the computing module 26 (see FIG. 1). Communication between the sending stations 12 and 14 and the computing module 26 may be via any conventional or suitable wired or wireless connection. The computing module 26 stores the association between the employee ID, container ID, item ID and authorized user ID (if access is restricted) for establishing chain of custody. Once all of the information has been input to prepare the carrier 50 for transmission, the user locks the carrier 50. In the present example, the user turns the numbers at the input 60 to lock the carrier 50. The carrier 50 is then sent to the desired receiving station in a conventional manner.

Figure 6:
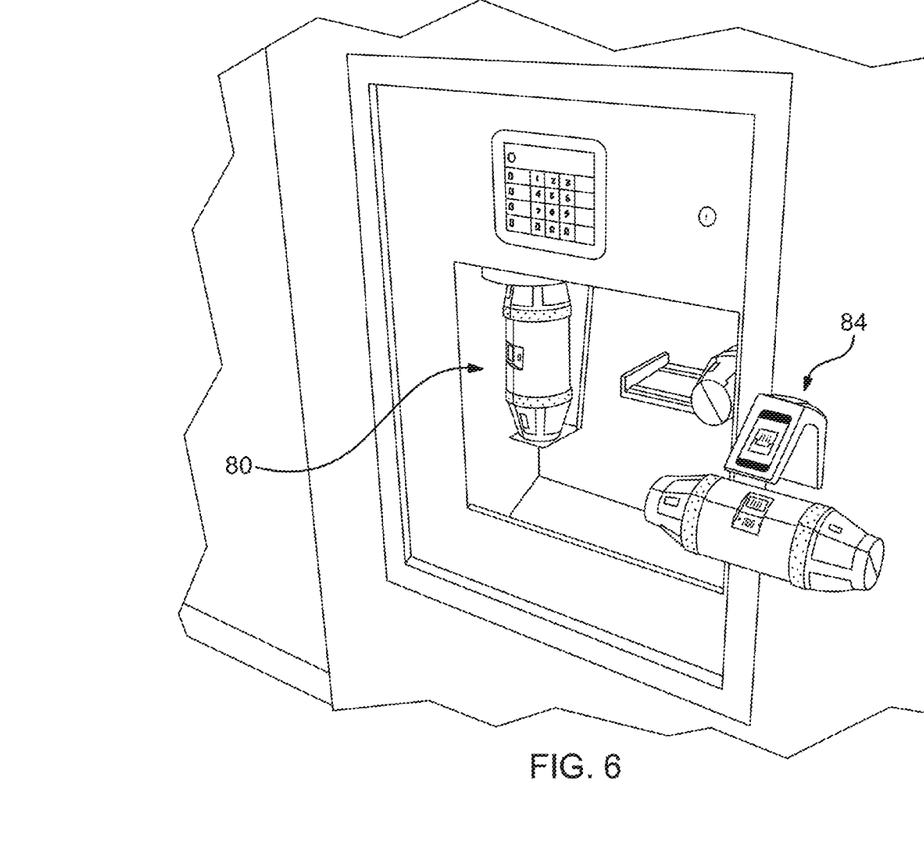
FIGS. 6-8 illustrate a receiving station having a barcode scanner/reader to authenticate a user included within the exemplary system.

FIG. 6 illustrates a receiving station 16, 18, 20, 22 which receives the carriers 50 from the sending stations 12, 14. As shown in FIG. 6, the receiving station 16, 18, 20, 22 includes a receiving point 80 where carriers are received, and an input device 84. As shown in FIG. 6, the input device 84 includes a barcode reader/scanner and a magnetic card/stripe reader. Of course, one skilled in the art will appreciate that other input devices, such as keypad entry, may be implemented without departing from the spirit and scope of the present invention. The input device 84 permits chain of custody identification, as well as authentication, to be performed to track the carrier 50 and its contents and, optionally, to ensure that a carrier 50 is only opened by an authorized user.

Figure 7A:
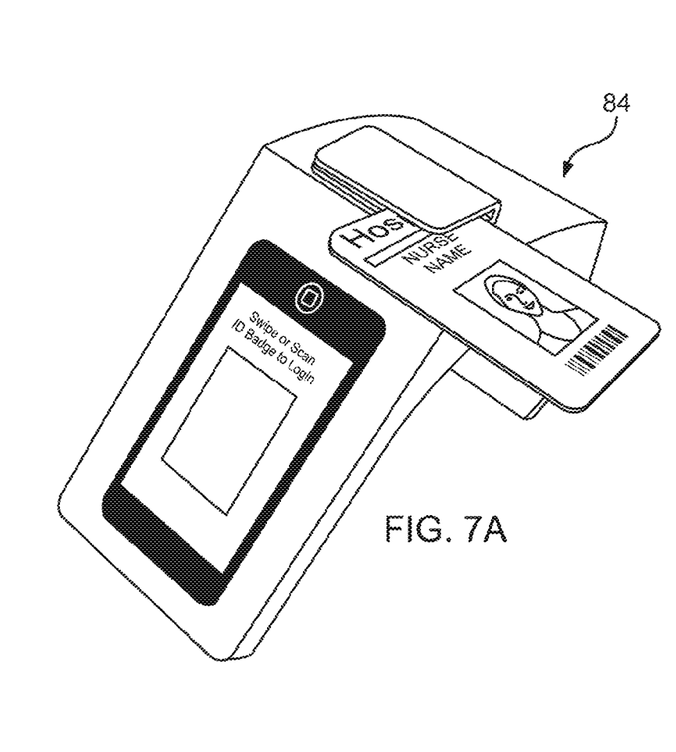
Figure 7B:
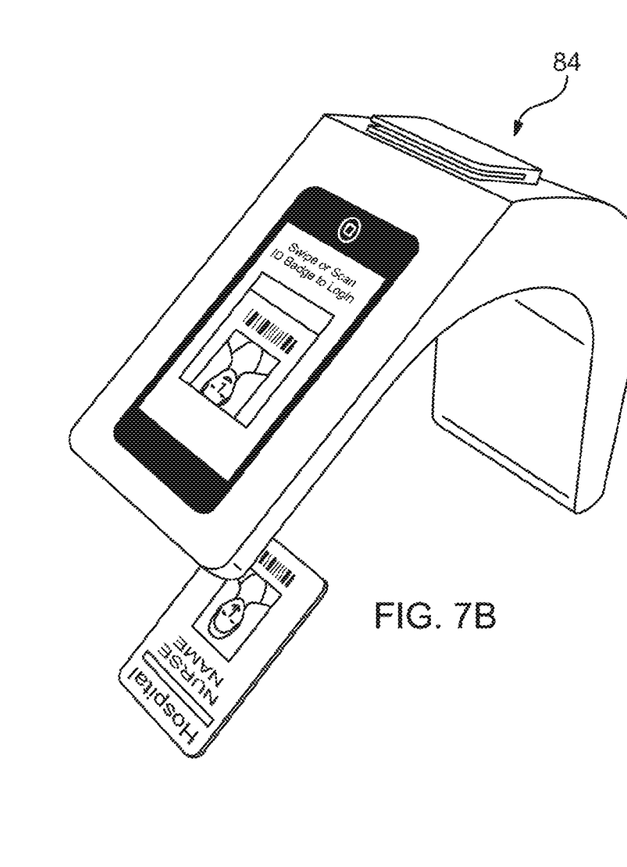

As shown in FIG. 7, when a carrier 50 is received at the receiving station 16, 18, 20, 22, an employee can identify themselves at the receiving station by, for example, either swiping their employee identification badge through a magnetic card/stripe reader (FIG. 7A), or scanning the barcode on their employee identification badge via the barcode reader (FIG. 7B) to input their user ID into the system 10, or any other conventional means.

Figure 8:
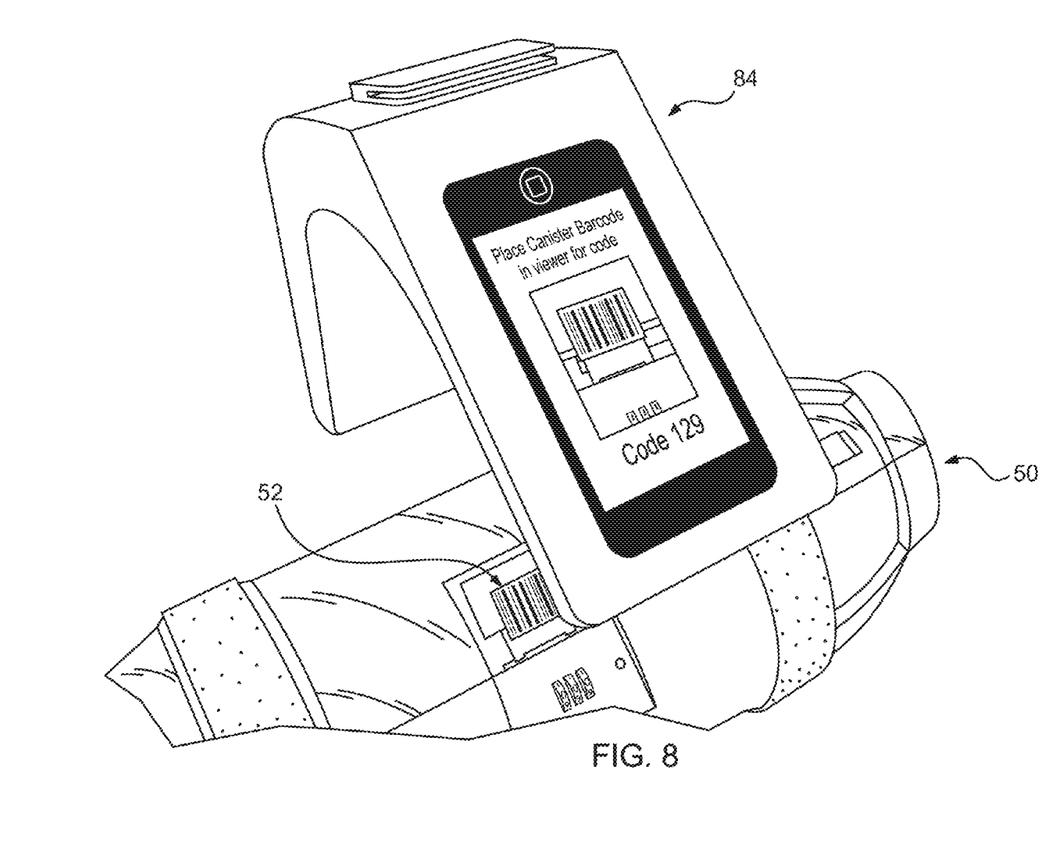

As shown in FIG. 8, the employee then scans the carrier barcode 52, via the barcode reader, to input the carrier ID into the system 10. This data is sent to the computing module 26 (see FIG. 1). As shown in FIG. 8, the system 10 provides the employee with the code or combination to open the carrier 50, via, for example, a display on the barcode reader/scanner of the input device 84. In this particular instance, the 3-digit code is "129". If access to the contents of the carrier 50 is restricted, the code or combination will only be provided to the user if the system 10 determines (e.g., by the computing module 26) that the employee is authorized to access the items in the carrier 50. Additionally, the history log (e.g., chain of custody) of the carrier and/or the item(s) can also be displayed on the display at the receiving station 16, 18, 20, 22.

Via the authentication steps described above, the system 10 tracks the carrier 50 through the facility, optionally controls access to the contents, and records information relating to the access of the contents to establish a chain of custody. The input information regarding, for example, at least the container ID and user ID are communicated by the receiving stations 16, 18, 20, 22 to the computing module 26 (see FIG. 1). Such information may include, for example, the employee who accessed the carrier, the date and time of such access, the carrier accessed, and the receiving station at which the carrier was accessed. Communication between the receiving stations 16, 18, 20, 22 and the computing module 26 may be via any conventional or suitable wired or wireless connection. The computing module 26 stores the association between the container ID and the user ID for establishing chain of custody. Since the computing module 26 already has stored an association between the container ID and the item ID, full chain of custody information can be obtained.

Figure 9:
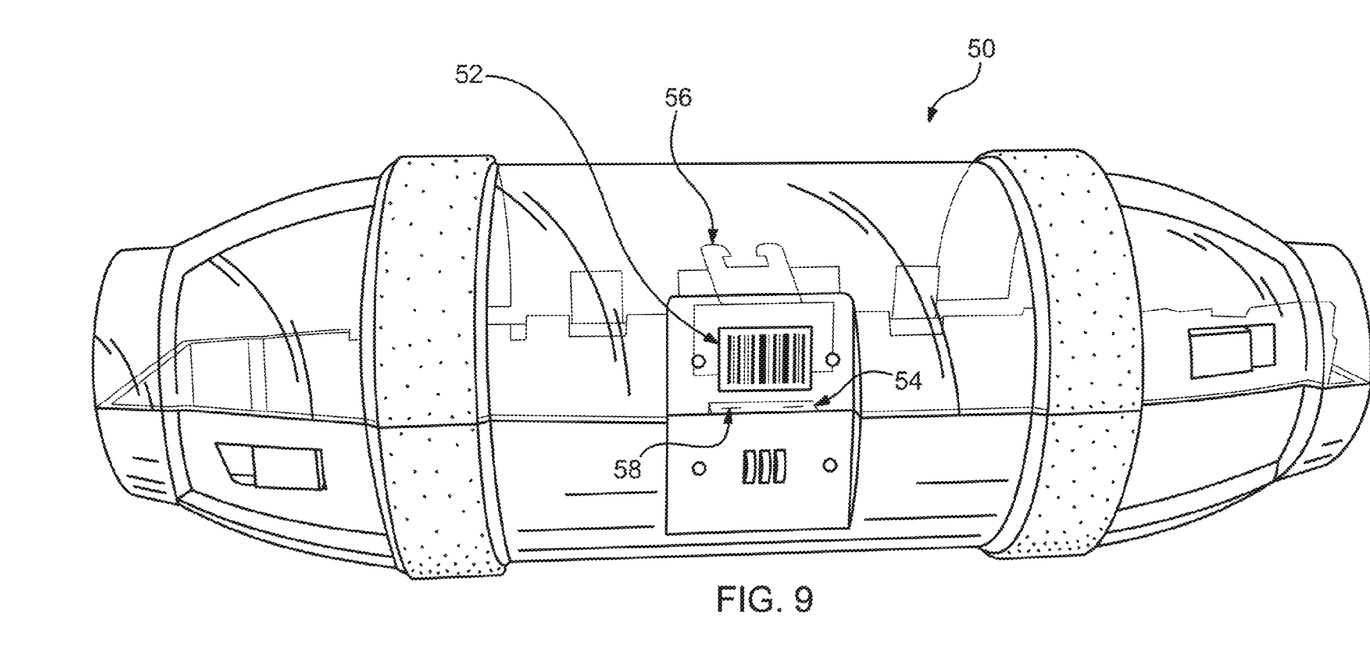
FIG. 9 illustrates the carrier of FIGS. 2-4 with the lock disengaged.

In the event that access to the carrier 50 is not to be restricted, the lock 54 can be disengaged, as shown in FIG. 9. As shown in FIG. 9, the latching mechanism 56 may be, for example, rotated such that is does not engage the female element 58 when the carrier is closed. Even if the carrier 50 is not locked, chain of custody information can still be collected in a manner as described above.

While barcode readers/scanners have been described as an exemplary means of inputting and reading data at the sending and receiving stations, various methods and modes of operation may be utilized without departing from the spirit and scope of the present invention. For example, at the sending stations, users can manually record, enter or key-in an identifying code of the container (container ID), along with an identifying code of the item or items placed within the container (item ID). This association can also be done more automatically using, for example, RFID tags/readers, NFC tags/readers, and/or other identifying means for either or both the container and item(s). Similarly, at the receiving stations, the carrier ID and/or the item(s) ID can be determined or otherwise input at the receiving location by many techniques, such as, for example, by keypad entry, RFID tags/readers, NFC tags/readers, other wireless technologies, physical labels, mechanical or electrical connections, and/or any other suitable means. The user ID can also be identified or otherwise input at the receiving location by many techniques, such as, for example, by keypad entry, magnetic card/stripe readers, RFID tags/readers, NFC tags/readers, other wireless technologies, PIN codes, biometric identification, and/or any other suitable means.

It will be appreciated that one or more exemplary embodiments of the present disclosure can employ hardware and/or software aspects. Software includes, but is not limited to, firmware, resident software, microcode, etc., that has been compiled to program a general purpose computer to be a specific purpose computer, or run a specific purpose computer. The memory devices could be implemented as an electrical, magnetic or optical memory, or any combination of these or other types of storage devices (including memory portions as described above with respect to cards). It should be noted that if distributed processors are employed, each distributed processor that makes up a processor carrying out a function or step generally contains its own addressable memory space. It should also be noted that some or all of computer systems and servers can be incorporated into an application-specific or general-use integrated circuit. For example, one or more method steps could be implemented in hardware in an ASIC rather than using firmware. Displays used in conjunction with each of the entities, servers and processors are representative of a variety of possible input/output devices.

Accordingly, it will be appreciated that one or more embodiments of the present disclosure can include a computer program comprising computer program code means adapted to perform one or all of the steps of any methods or claims set forth herein when such program is run on a computer, and that such program may be embodied on a computer readable medium. Further, one or more embodiments of the present disclosure can include a computer comprising code adapted to cause the computer to carry out one or more steps of methods or claims set forth herein, together with one or more apparatus elements or features as depicted and described herein.

Figure 10:
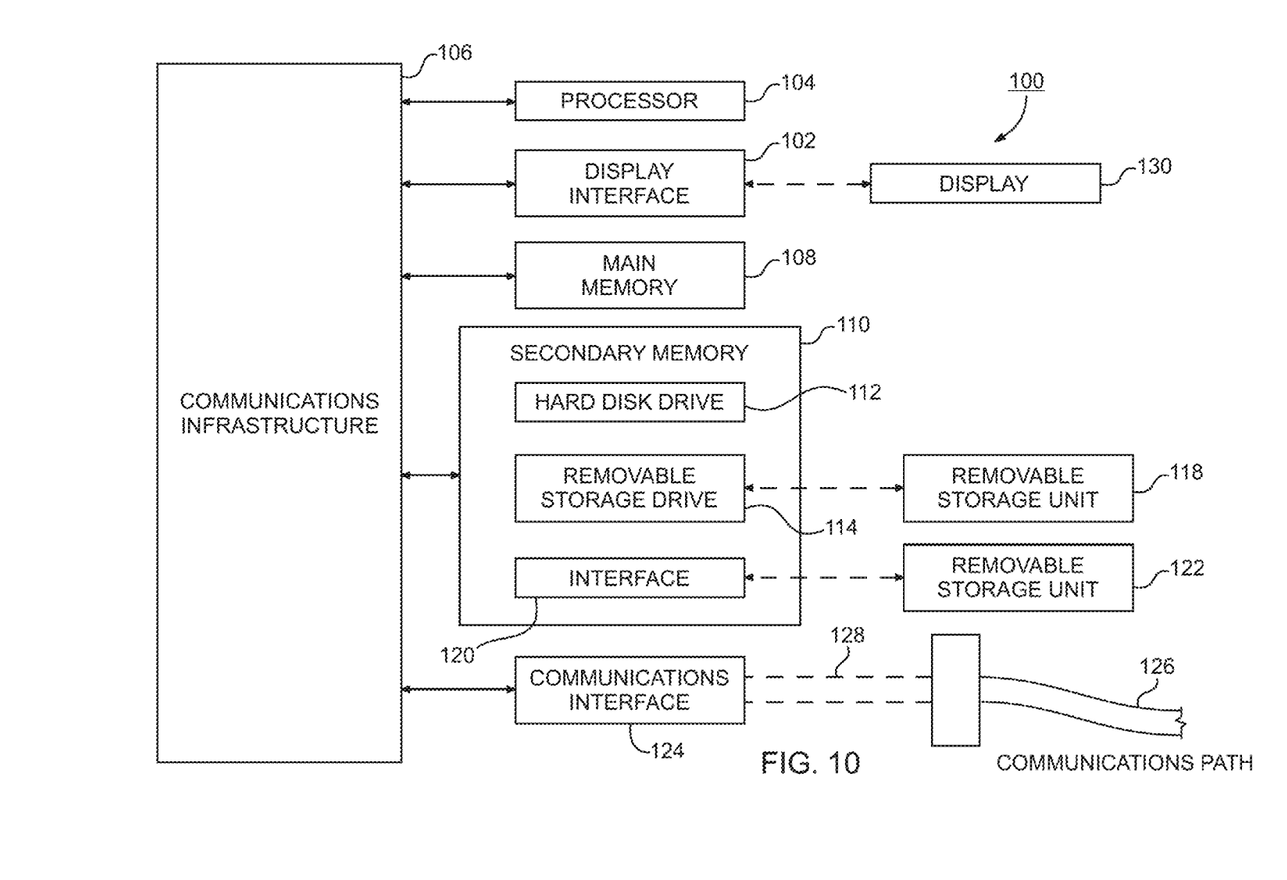
FIG. 10 is a block diagram illustrating system architecture of a computer system in accordance with exemplary embodiments

FIG. 10 illustrates a computer system 100 in which embodiments of the present disclosure, or portions thereof, may be implemented as computer-readable code. For example, the computing module 26 and the various sending 12, 14 and receiving 16, 18, 20, 22 stations may be implemented in the computer system 100 using hardware, software, firmware, non-transitory computer readable media having instructions stored thereon, or a combination thereof and may be implemented in one or more computer systems or other processing systems.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, mini-computers, mainframe computers, computers linked or clustered with distributed functions, as well as pervasive or miniature computers that may be embedded into virtually any device. For instance, at least one processor device and a memory may be used to implement the above described embodiments.

A processor device as discussed herein may be a single processor, a plurality of processors, or combinations thereof. Processor devices may have one or more processor "cores". The terms "computer program medium", "non-transitory computer readable medium", and "computer usable medium" as discussed herein are used to generally refer to tangible media such as a removable storage unit 118, a removable storage unit 122, and a hard disk installed in hard disk drive 112.

Various embodiments of the present disclosure are described in terms of this example computer system 100. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

The computer system 100 includes a display 130 connected to a communications infrastructure 106 via a display interface 102. In an embodiment, the display 130, in conjunction with the display interface 102, provides a user interface (UI) for the various users. The computer system 100 also includes a processor device 104, which may be a special purpose or a general purpose processor device. The processor device 104 may be connected to a communication infrastructure 106, such as a bus, message queue, network (e.g., the network), multi-core message-passing scheme, etc. The computer system 100 may also include a main memory 108 (e.g., random access memory, read-only memory, etc.), and may also include a secondary memory 110. The secondary memory 110 may include the hard disk drive 112 and a removable storage drive 114, such as a floppy disk drive, a magnetic tape drive, an optical disk drive, a flash memory, etc.

The removable storage drive 114 may read from and/or write to the removable storage unit 118 in a well-known manner. The removable storage unit 118 may include a removable storage media that may be read by and written to by the removable storage drive 114. For example, if the removable storage drive 114 is a floppy disk drive, the removable storage unit 118 may be a floppy disk. In one embodiment, the removable storage unit 118 may be non-transitory computer readable recording media.

In some embodiments, the secondary memory 110 may include alternative means for allowing computer programs or other instructions to be loaded into the computer system 100, for example, the removable storage unit 122 and an interface 120. Examples of such means may include a program cartridge and cartridge interface (e.g., as found in video game systems), a removable memory chip (e.g., EEPROM, PROM, etc.) and associated socket, and other removable storage units 122 and interfaces 120 as will be apparent to persons having skill in the relevant art.

The computer system 100 may also include a communications interface 124. The communications interface 124 may be configured to allow software and data to be transferred between the computer system 100 and external devices. Exemplary communications interfaces 124 may include a modem, a network interface (e.g., an Ethernet card), a communications port, a PCMCIA slot and card, etc. Software and data transferred via the communications interface 124 may be in the form of signals 128, which may be electronic, electromagnetic, optical, or other signals capable of being received by the communications interface 124, as will be apparent to persons having skill in the relevant art. The signals 128 may travel via a communications path 126, which may be configured to carry the signals and may be implemented using wire, cable, fiber optics, a phone line, a cellular phone link, a radio frequency link, etc.

Computer program medium and computer usable medium may refer to memories, such as the main memory 108 and secondary memory 110, which may be memory semiconductors (e.g., DRAMs, etc.). These computer program products may be means for providing software to the computer system 100. Computer programs (e.g., computer control logic) may be stored in the main memory 108 and/or the secondary memory 110. Computer programs may also be received via the communications interface 124. Such computer programs, when executed, may enable computer system 100 to implement the present methods as discussed herein. Accordingly, such computer programs may represent controllers of the computer system 100. Where the present disclosure is implemented using software, the software may be stored in a computer program product and loaded into the computer system 100 using the removable storage drive 114, interface 120, and hard disk drive 112, or communications interface 124.

The foregoing description of the specific embodiments will so fully reveal the general nature of the present disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance. The breadth and scope of the present disclosure should not be limited by any of the above-described exemplary embodiments, but should be defined only in accordance with the following claims and their equivalents.

While the present invention has described herein with particular reference to the drawings, it should be understood that various modifications could be made without departing from the spirit and scope of the present invention. Those skilled in the art will appreciate that various other modifications and alterations could be developed in light of the overall teachings of the disclosure. The presently preferred embodiments described herein are meant to be illustrative only and not limiting as to the scope of the invention which is to be given the full breadth of the appended claims and any and all equivalents thereof.

We claim:

1. A system for tracking and controlling access to transported articles, the system comprising:
    a computing module having a database and a processor connected to the database, the computing module being in signal communication with a sending station and at least one receiving station, wherein a carrier is transported from the sending station to the at least one receiving station though tubes of a pneumatic tube delivery system, wherein the at least one receiving station comprises a receiving point for receiving the carrier, the receiving point separate from the pneumatic tube delivery system such that when the carrier is received at the receiving point other carriers may be transported through the pneumatic tube delivery system;

a first input device provided at the sending station and configured for receiving identifying information identifying the carrier ("carrier ID") and an item ("item ID") placed within the carrier for delivery to the at least one receiving station via the pneumatic tube delivery system, wherein the carrier ID and the item ID are transmitted to the computing module and the carrier is locked prior to delivery; and a second input device provided at the at least one receiving station and separate from the receiving point, the second input device configured for receiving the carrier ID for the carrier received at the at least one receiving station and identifying information for an individual ("user ID") at the at least one receiving station, wherein the carrier ID and the user ID are transmitted to the computing module;

wherein, after the carrier is removed from the receiving point and the carrier ID and user ID of the individual that is provided access to the item is entered into the second input device of the at least one receiving station, the computing module facilitates unlocking the carrier to allow access to the item inside, wherein the computing module is configured to record the user ID of the individual that is provided access to the item within the carrier, time of access to the item, and the associated carrier ID and item ID to provide chain of custody information for tracking the item.

2. The system of claim 1, wherein the first input device at the sending station comprises a first barcode reader for scanning an identifying tag on the carrier to obtain the carrier ID and an identifying tag on the item to obtain the item ID.

3. The system of claim 1, wherein the second input device at the at least one receiving station comprises a second barcode reader for scanning an identifying tag on the received carrier to obtain the carrier ID and an identifying tag of the individual at the at least one receiving station to obtain the user ID.

4. The system of claim 1, wherein the carrier includes a combination lock for locking the carrier and securing the item within, and wherein the computing module unlocks the carrier by providing the individual with a combination to the combination lock via the second input device.

5. The system of claim 1, wherein the computing module automatically unlocks the received carrier upon receiving the user ID from the second input device.

6. The system of claim 1, wherein the computing module is configured to provide chain of custody information for the carrier and/or its contents.

7. The system of claim 1, wherein the first input device is further configured for receiving identifying information identifying an individual authorized to open the carrier and access the item placed within ("authorized user ID"), wherein the authorized user ID is transmitted to the computing module, and wherein the computing module is configured to unlock the carrier and allow access to the item inside if the user ID matches the authorized user ID for the carrier ID received at the at least one receiving station, and to record the user ID of the individual that is provided access to the item within the carrier, time of access to the item, and the associated carrier ID and/or item ID to provide chain of custody information for tracking the item.

8. The system of claim 1, wherein the first input device is further configured for receiving identifying information identifying an intended destination of the carrier, wherein the computing module is configured to unlock the carrier and allow access to the item inside if it is determined, by the computing module, that the carrier is at its intended destination, and to record the user ID of the individual that is provided access to the item within the carrier, time of access to the item, and the associated carrier ID and/or item ID to provide chain of custody information for tracking the item.

9. The system of claim 1, wherein the first input device at the sending station receives the carrier ID and the item ID via at least one of RFID tags/readers and NFC tags/readers.

10. The system of claim 1, wherein the second input device at the at least one receiving station receives the user ID via at least one of RFID tags/readers, NFC tags/readers and magnetic card/stripe readers.

11. The system of claim 1, wherein the computing module is configured to display a history log of the carrier and/or the item on a display located at the at least one receiving station.

12. A method for tracking and controlling access to transported articles, the method comprising the steps of:

receiving, by a computing module including a processor and a data storage medium, identification information for a carrier ("carrier ID") and an item ("item ID") placed within the carrier, the identification information sent from a first input device at a sending station;

locking the carrier with the item inside;

transporting the locked carrier from a sending station to a desired receiving station of at least one receiving station through tubes of a pneumatic tube delivery system, the at least one receiving station comprising a receiving point for receiving the carrier, the receiving point separate from the pneumatic tube delivery system such that when the carrier is received at the receiving point other carriers may be transported through the pneumatic tube delivery system;

receiving, by the computing module, the carrier ID for the carrier received at the at least one receiving station and an individual ("user ID") located at the at least one receiving station, the identification information sent from a second input device provided at the at least one receiving station and separate from the receiving point;

wherein when the carrier has been delivered to the desired receiving station:

authorizing that the received user ID can access the carrier; and if the user ID is authorized, unlocking the carrier; and recording the user ID of the individual that is provided access to the item within the carrier, time of access to the item, and the associated carrier ID and item ID to provide chain of custody information for tracking the item.

13. The method of claim 12, wherein the sending station includes a first barcode reader for scanning an identifying tag on the carrier to obtain the carrier ID and an identifying tag on the item to obtain the item ID, and sending the scanned identification information to the computing module.

14. The method of claim 12, wherein the at least one receiving station includes a second barcode reader for scanning the identifying tag on the received carrier to obtain the carrier ID and an identifying tag of the individual to obtain the user ID at the at least one receiving station, and sending the scanned identifying information to the computing module.

15. The method of claim 12, wherein the carrier includes a combination lock for locking the carrier and securing the item within, and wherein the computing module provides the individual with a combination to the combination lock via the second input device.

16. The method of claim 12, wherein the computing module automatically unlocks the received carrier upon receiving the user ID from the second input device.

17. The method of claim 12, wherein the computing module is configured to provide chain of custody information for the carrier and/or its contents based on the identification information from the sending station and at least one receiving station.

18. The method of claim 12, further comprising the steps of:

receiving, by the computing module, identification information for an authorized recipient ("authorized user ID") of the item within the carrier, wherein the computing module is configured to unlock the carrier and allow access to the item inside if the user ID matches the authorized user ID for the carrier ID received at the at least one receiving station, and to record the user ID of the individual that is provided access to the item within the carrier, time of access to the item, and the associated carrier ID and item ID to provide chain of custody information for tracking the item.

19. The method of claim 12, further comprising the steps of:

receiving, by the computing module, identifying information identifying an intended destination of the carrier, wherein the computing module is configured to unlock the carrier and allow access to the item inside if it is determined, by the computing module, that the carrier is at its intended destination, and to record the user ID of the individual that is provided access to the item within the carrier, time of access to the item, and the associated carrier ID and item ID to provide chain of custody information for tracking the item.

20. The method of claim 12, wherein the first input device at the sending station receives the carrier ID and the item ID via at least one of RFID tags/readers and NFC tags/readers.

21. The method of claim 12, wherein the second input device at the at least one receiving station receives the user ID via at least one of RFID tags/readers, NFC tags/readers and magnetic card/stripe readers.

22. The method of claim 12, wherein the computing module is configured to display a history log of the carrier and/or the item on a display located at the at least one receiving station.

* * * * *